US010445020B2

(12) United States Patent
Vorobyov et al.

(10) Patent No.: US 10,445,020 B2
(45) Date of Patent: Oct. 15, 2019

(54) COMPUTER-IMPLEMENTED METHOD AND A SYSTEM FOR ENCODING A STACK APPLICATION MEMORY STATE USING SHADOW MEMORY

(71) Applicant: COMMISSARIAT A L'ENERGIE ATOMIQUE ET AUX ENERGIES ALTERNATIVES, Paris (FR)

(72) Inventors: Kostyantyn Vorobyov, Palaiseau (FR); Nikolay Kosmatov, Saint-Cyr-l'Ecole (FR); Julien Signoles, Fontenay-aux-Roses (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 50 days.

(21) Appl. No.: 15/826,571

(22) Filed: Nov. 29, 2017

(65) Prior Publication Data
US 2018/0157442 A1    Jun. 7, 2018

(30) Foreign Application Priority Data
Dec. 7, 2016  (EP) .................................... 16306629

(51) Int. Cl.
*G06F 3/06*    (2006.01)
*G06F 12/02*   (2006.01)

(52) U.S. Cl.
CPC .......... *G06F 3/0659* (2013.01); *G06F 3/0604* (2013.01); *G06F 3/0683* (2013.01); *G06F 12/023* (2013.01); *G06F 2212/1044* (2013.01)

(58) Field of Classification Search
CPC .... G06F 3/0659; G06F 3/0604; G06F 3/0683; G06F 12/023; G06F 2212/1044
See application file for complete search history.

(56) References Cited

U.S. PATENT DOCUMENTS 6,915,415 B2 * 7/2005 Mayfield ............. G06F 9/30047
                                                 711/137
7,594,093 B1 * 9/2009 Kancherla ............... G06F 12/04
                                                 711/203
(Continued)

OTHER PUBLICATIONS

A. Jakobsson et al., "Fast as a shadow, expressive as a tree: Hybrid memory monitoring for C," Proceedings of the 30th Annual ACM Symposium on Applied Computing, Jan. 1, 2015, pp. 1765-1772, XP055354832.

(Continued)

*Primary Examiner* — Nanci N Wong
(74) *Attorney, Agent, or Firm* — Baker & Hostetler LLP

(57) ABSTRACT

A method is provided that allows tracking boundaries of allocated memory blocks while still capturing byte-level properties. This is achieved with a particular shadow memory encoding scheme which captures boundaries and lengths of allocated memory blocks. Analyzing the shadow memory state allows detecting memory safety issues. In particular, for a memory location given by its address a, the proposed invention allows computing the following information: whether a has been allocated, whether a has been initialized, the start (base) address of the memory block a belongs to, the byte-length of the memory block a belongs to, the byte offset of a within its block. Such information allows for detection of specific memory safety issues at runtime.

24 Claims, 8 Drawing Sheets

(56) References Cited

U.S. PATENT DOCUMENTS

| | | | |
|---|---|---|---|
| 2004/0030951 A1* | 2/2004 | Armangau | G06F 11/1469 714/6.11 |
| 2006/0288181 A1* | 12/2006 | Wyles | G06F 9/5016 711/163 |
| 2011/0231826 A1 | 9/2011 | Narasimhan | |
| 2012/0198284 A1* | 8/2012 | Li | G06F 11/362 714/42 |
| 2012/0278665 A1* | 11/2012 | Serebryany | G06F 11/073 714/53 |
| 2017/0235684 A1* | 8/2017 | Wang | G06F 12/0802 711/118 |

OTHER PUBLICATIONS

R. Hastings et al., "Purify: Fast detection of memory leaks and access errors," In Proceedings of the Winter USENIX Conference, pp. 125-136, Jan. 1992.

J. Seward et al., "Using valgrind to detect undefined value errors with bit-precision," In Proceedings of the USENIX Annual Technical Conference, pp. 17-30, USENIX, 2005.

W. Cheng et al., "Tainttrace: Efficient flow tracing with dynamic binary rewriting," In Proceedings of the IEEE Symposium on Computers and Communications, pp. 749-754, IEEE Computer Society, Jun. 2006.

D. Bruening et al., "Practical memory checking with Dr. Memory," In Proceedings of the Annual IEEE / ACM International Symposium on Code Generation and Optimization, CGO '11, pp. 213-223, 2011, IEEE Computer Society.

K. Serebryany et at,"AddressSanitizer: A fast address sanity checker," In Proceedings of the USENIX Annual Technical Conference, pp. 309-319, USENIX Association, Jun. 2012.

Q. Zhao et al., "Umbra: Efficient and scalable memory shadowing," In Proceedings of the International Symposium on Code Generation and Optimization, pp. 22-31, ACM, Apr. 2010.

* cited by examiner

COMPUTER-IMPLEMENTED METHOD AND A SYSTEM FOR ENCODING A STACK APPLICATION MEMORY STATE USING SHADOW MEMORY

CROSS-REFERENCE TO RELATED APPLICATIONS

This application claims priority to foreign European patent application No. EP 16306629.3, filed on Dec. 7, 2016, the disclosure of which is incorporated by reference in its entirety.

FIELD OF THE INVENTION

The present invention relates to the field of runtime analysis of an application's memory state. In particular, the invention relates to the field of memory shadowing techniques which associate addresses from an application's memory to values stored in one or several disjoint memory region(s) called shadow memory. An object of the invention is a method for encoding the application's memory state using shadow memory. The invention concerns in particular stack memory which is used to automatically allocate memory in a program, for example for local variables.

The invention also focuses on using shadow memory to detect attempts by a computer program to access memory that is not properly allocated for such an access.

The invention consists of a computer-implemented method and a system for detecting illegal memory accesses by a computer program, where a memory access denotes reading a value from a memory location or writing a value to it.

BACKGROUND

Computer programs typically execute on computers or equivalent systems that comprise a processor and a memory. A computer program executed by an operating system is represented by one or several processes. Physical memory is typically managed by a computer's operating system in order to provide each process with a virtual memory space. The virtual memory space of a process is accessed by the program to write and read values. Each process has its own virtual memory space. Alternatively, computer memory can be managed directly, without using virtual memory. Memory is organized into locations, each having a unique address. Typically, memory is represented by a contiguous array of cells with byte-level addressing.

A process of reserving memory for the use of an application is called allocation. Memory is allocated in memory blocks, where a memory block refers to a contiguous memory region identified by its start and end addresses.

A virtual memory space of an executing process is typically divided into several memory segments used for different purposes. These segments are represented by disjoint contiguous memory regions.

Stack is a memory segment commonly assigned to saving local variables automatically allocated and de-allocated by programs at runtime. Stack memory is reserved for automatic memory allocation at runtime.

Global memory refers to memory allocated by programs statically, at compile-time. Static allocation typically represents global variables used by a program.

Heap memory is usually the largest part of the memory and is reserved for dynamically allocated memory blocks. Typically, a program can dynamically allocate memory by calling a dedicated function. An example of such a function is the malloc function in the C programming language. When the allocated memory is no longer required, the program can also call an operating system procedure to deallocate the allocated memory so that it can be reused by the program.

The invention applies more particularly to stack (automatically allocated) memory but can also apply to dynamically or statically allocated memory.

At a source code level of programming languages, memory can be accessed using pointers that are special variables containing addresses of memory locations. Some pointer p is said to point to a memory block B if p stores an address from B.

A memory access refers to reading a value from memory location or writing a value to a memory location.

A problem may arise if a program accesses a memory location that was not allocated. Another problem may arise when the program accesses an allocated memory location through a pointer which does not point to a memory block containing that location.

Problems mentioned in the above paragraph relate to a broader class of issues often referred to as memory safety, which includes (but are not limited to) illegal memory accesses, memory leaks, illegal dereferences, double free errors, reading uninitialized data. Consequences of such problems differ in severity and range from inconsistent behaviors to issues compromising security of applications and program crashes. It is therefore important to detect such memory violations.

The general purpose of the invention is to provide a shadow-state encoding mechanism that allows to track the memory state of an executing program at runtime. Even though the invention is general and potentially applies to heap memory as well as global allocations, its main focus is on tracking memory blocks allocated on a program's stack at runtime.

Memory shadowing is a general technique for tracking properties of an application's data at runtime. In its typical use, memory shadowing associates addresses from the application's memory to shadow values stored in a disjoint memory region (or regions) called shadow memory. During a program's execution shadow values act as metadata that store information about the memory addresses they are mapped to.

Memory shadowing has many applications, one of them is memory analysis where shadow values are used to track memory and detect safety problems. Examples of such existing mechanisms are described in particular in references [1] and [2].

Shadow state encoding refers to a process of designing the structure of shadow values and their interpretation. The prior art contains shadow state encoding mechanisms that vary across different tools. Some implementations use shadow values to store bit-level states of the memory locations they aim to characterize.

Reference [3] discloses a tool using shadow state encoding focused on detection of information leakage at runtime. The proposed method uses one bit to tag each addressable byte from an application's memory as public or private. Another method disclosed in reference [4] relates to a memory debugger which shadows one byte by two bits which indicate whether that byte is allocated and initialized. Reference [2] introduces a method that uses bit-to-bit shadowing to track initialization status of every bit. Reference [5] proposes to customize memory allocation to ensure that memory blocks are allocated at an 8-byte boundary, and to track aligned 8-byte sequences by one shadow byte. American patent U.S. Pat. No. 8,762,797 also describes the same method as reference [5].

The shadow state encoding methods of prior art have been proven useful for tracking memory at bit-level and byte-level. These methods, however, are limited in their capacity to identify properties with respect to memory blocks. More particularly, the existing tools using shadow memory do not capture enough metadata to identify the bounds and the length of a memory block a given address belongs to. Therefore, existing methods cannot detect a memory violation concerning an access to an allocated memory location through a pointer which does not point to a memory block the location belongs to.

The present invention is proposed in view of the above problem and relates to the use of shadow memory during runtime memory-safety analysis of computer programs. The invention aims at resolving the limitations of the prior art's shadow state encoding methods with a new method that allows tracking boundaries of allocated memory blocks while still capturing byte-level properties. This is achieved with a particular shadow memory encoding scheme which captures boundaries and lengths of allocated memory blocks. Analyzing the shadow memory state allows detecting memory safety issues.

In particular, for a memory location given by its address a, the proposed invention allows computing the following information: whether a has been allocated, whether a has been initialized, the start (base) address of the memory block a belongs to, the byte-length of the memory block a belongs to, the byte offset of a within its block. Such information allows for detection of specific memory safety issues at runtime.

SUMMARY OF THE INVENTION

An object of the invention is a computer-implemented method for encoding an application memory that a program, executed on a computer, has access to, using a shadow memory corresponding to the application memory, the method comprising:
creating and initializing a primary shadow memory, each byte in the application memory being mapped to a corresponding byte in the primary shadow memory,
for each memory block in the application memory that the program allocates, encoding a corresponding primary shadow memory block, in the primary shadow memory, by:
comparing the length L of the memory block with a predetermined value T and, if L is smaller or equal to T,
for each byte p in the primary shadow memory block corresponding to a byte b in the application memory block, writing in Nb bits of the byte p, a first code value that encodes the length of the memory block and the offset of the byte b within the memory block.

In a particular embodiment, the method for encoding an application memory according to the invention also comprises:
creating and initializing a secondary shadow memory, each byte in the application memory being mapped to a corresponding byte in the secondary shadow memory,
for each memory block in the application memory that the program allocates, comparing the length L of the memory block with a predetermined value T and, if L is greater than T:
defining a corresponding secondary shadow memory block, in the secondary shadow memory, being divided into segments having all equal sizes and trailing bytes,
encoding a corresponding primary shadow memory block, in the primary shadow memory, by, for each byte of the primary shadow memory block, writing, in Nb bits of the byte, a second code value that encodes an offset between a corresponding byte in a secondary shadow memory block and a base address of a segment in the secondary shadow memory block,
encoding the secondary shadow memory block, by:
writing in a first part of each segment, a value indicative of the length of the memory block,
writing in a second part of each segment, a value indicative of the offset from the base address of the segment to the base address of the secondary shadow memory block.

In a particular embodiment of the invention, the first code value ranges from 1 to a first predetermined value $n_1$ and the second code value ranges from a second predetermined value $n_2$ to $2^{Nb}-1$.

In a particular embodiment of the invention, the first predetermined value $n_1$ equals 36 and the second predetermined value $n_2$ equals 49.

In a particular embodiment of the invention, Nb is equal to 6.

In a particular embodiment of the invention, T is equal to 8 bytes.

In a particular embodiment, the method for encoding an application memory according to the invention also comprises for each byte of the primary shadow memory block, assigning, to one bit of the byte, a value indicative of the initialization of the corresponding byte in the memory block.

In a particular embodiment of the invention, the application memory comprises stack memory.

Another object of the invention is a computer-implemented method for detecting illegal memory access by a program executed on a computer having a processor and an application memory, the method comprising:
executing the method for encoding an application memory according to the invention and,
when the program accesses to an address in an application memory block, analyzing the primary shadow memory block to determine if the access is illegal.

In a particular embodiment of the invention, analyzing the shadow memory block to determine if the access is illegal comprises determining the length of the memory block and the offset of the address within the memory block.

In a particular embodiment of the invention, determining if the access is illegal comprises comparing the offset of the address within the memory block and the length of the memory block.

In a particular embodiment of the invention, the address is equal to a base address plus an offset value and determining if the access is illegal comprises comparing the length of the memory block with the offset of the base address within the memory block plus said offset value.

In a particular embodiment of the invention, determining if the access is illegal comprises reading a code value in a byte in the primary shadow memory block that maps the address.

In a particular embodiment, the method for detecting illegal memory access according to the invention also comprises comparing the code value with a predetermined value encoding the information that the address refers to unallocated memory.

In a particular embodiment, the method for detecting illegal memory access according to the invention also comprises comparing the code value with a predetermined value encoding the information that the length of the memory block is smaller or equal to a predetermined value.

In a particular embodiment of the invention, determining the length of the memory block comprises decoding the code value.

In a particular embodiment of the invention, determining the offset of the address within the memory block comprises decoding the code value.

In a particular embodiment, the method for detecting illegal memory access according to the invention also comprises comparing the code value with a predetermined value encoding the information that the length of the memory block is greater than a predetermined value.

In a particular embodiment of the invention, determining the length of the memory block comprises:
 decoding the code value,
 determining, from the code value, the base address of a segment in a secondary shadow memory block,
 reading a first value in the segment to determine the length of the memory block.

In a particular embodiment of the invention, determining the offset of address within the memory block comprises:
 reading a second value in the segment to determine an offset from the base address of the segment to the base address of the secondary shadow memory block,
 determining the base address of the secondary shadow memory block,
 determining the offset of address within the memory block from the base address of the secondary shadow memory block.

In a particular embodiment, the method for detecting illegal memory access according to the invention also comprises determining if the address is initialized by evaluating a bit of the byte in the primary shadow memory block that maps the address.

Another object of the invention is a system for detecting illegal memory access by a program executed by the system, the system comprising an application memory and a processor configured to execute the steps of any of the computer-implemented methods according to the invention.

Another object of the invention is a computer program product, comprising computer-executable instructions for executing any of the computer-implemented methods according to the invention, when said computer program is executed on a processor.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, illustrate some embodiments of the invention.

DETAILED DESCRIPTION

Figure 1:
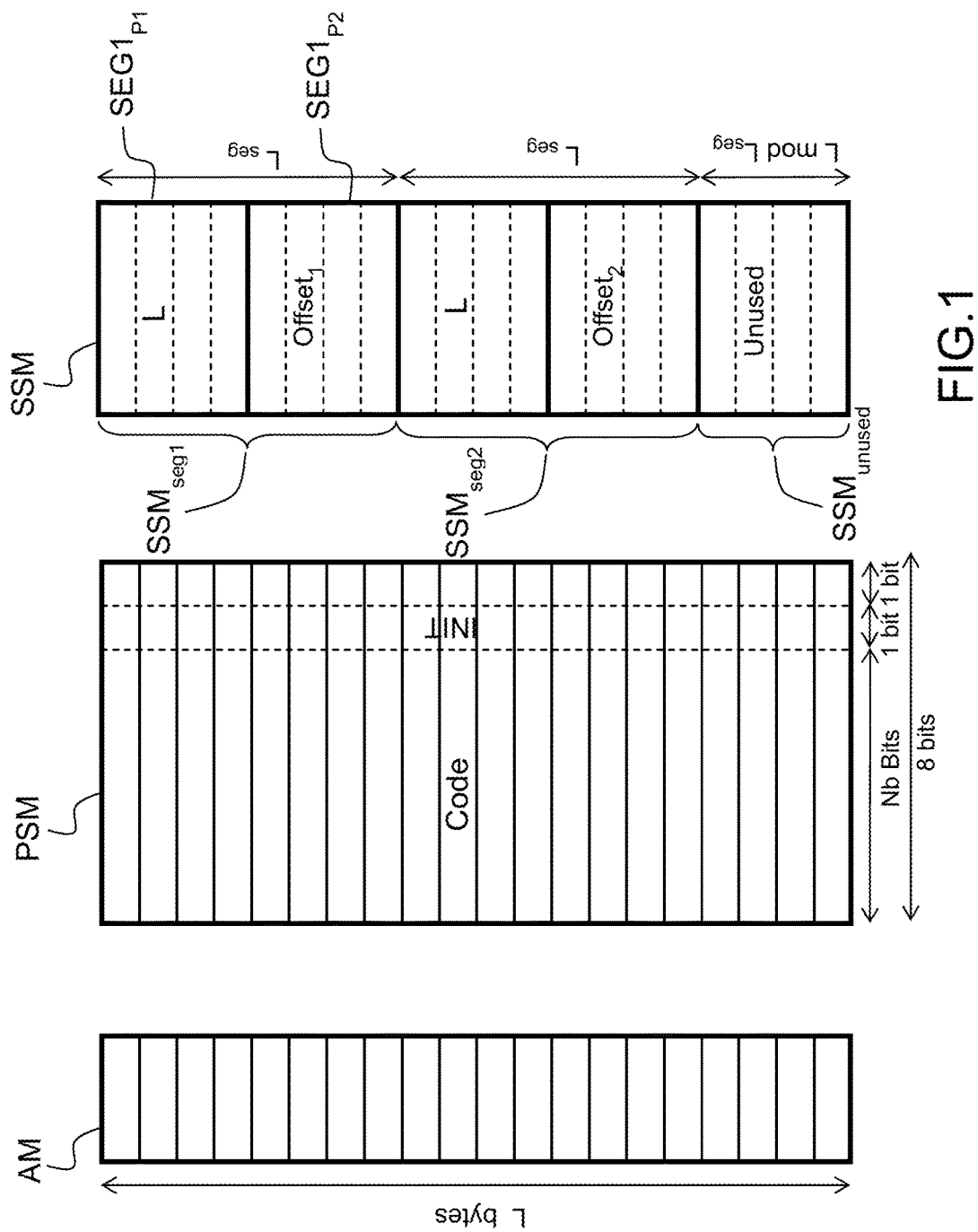
FIG. 1 shows a representation of a memory block, a corresponding primary shadow memory block and a corresponding secondary shadow memory block according to an embodiment of the invention.

The method according to the invention applies to computer programs that manage memory through automatic allocation in a virtual memory space of a computer process, where random access memory is represented by a contiguous array of memory cells with byte-level addressing.

The following paragraphs give general definitions of terms and concepts that will be referred to throughout the description.

A virtual memory space of a computer process is linear and segmented, consisting of text, stack, heap and potentially other segments. The order of the segments is unspecified, however each segment is represented by a contiguous memory region disjoint with any other segment.

At runtime a program allocates memory in units referred to as memory blocks. A memory block is a contiguous memory region described by its start and end addresses. The start address of a memory block, also referred to as its base address, is less than or equal to its end address. The length of the memory block is the difference between the block's end and base addresses increased by 1. A memory address a is said to belong to a memory block B if a is greater than or equal to the base address of B and less than or equal to the end address of B. The byte offset of an address a belonging to a memory block B is the difference between a and the base address of B. A memory block B is said to be aligned at a boundary of N, if the base address of B is divisible by N. A memory block B is said to be padded with N bytes if its base address is preceded by at least N bytes of unusable memory.

At any given moment, memory allocation of an executing computer program consists of disjoint memory blocks allocated statically, dynamically or automatically. Static memory allocation refers to allocation of memory blocks at compile-time and typically represents global variables. Automatically allocated memory refers to memory blocks allocated on a program's stack at runtime. It usually represents local variables. In a typical program, automatically allocated memory blocks are unaligned or aligned at a boundary of two and placed one after another. The invention applies to allocated memory blocks of one or more bytes in length. Dynamically allocated memory refers to memory blocks allocated on a program's heap at runtime.

The invention generally relates to automatically allocated memory and uses the known concept of shadow memory to track metadata concerning application memory allocation in a program's stack. In the following description, expression "application memory" is used to refer to memory used by a program which can access it to write and read values. Expression "shadow memory" designates memory used to store metadata about allocation of application memory. Shadow memory cannot be used by an application.

Shadow memory is represented by one or several contiguous memory regions disjoint with the application memory space used by an executing program. The shadow mapping scheme can be either a direct mapping scheme (known as DMS), where a single memory space is used to shadow the entire address space, or a segmented mapping scheme (known as SMS) that segregates a program's address space into shadow segments.

Generally, there is a mapping correspondence between application memory and shadow memory. A mapping function is used to translate an address from application memory to shadow memory and vice versa. Reference [6] gives an example of a suitable shadowing mapping scheme.

Though the following description of the invention is made with reference to examples concerning stack memory, the invention may also apply to heap memory.

Figure 2:
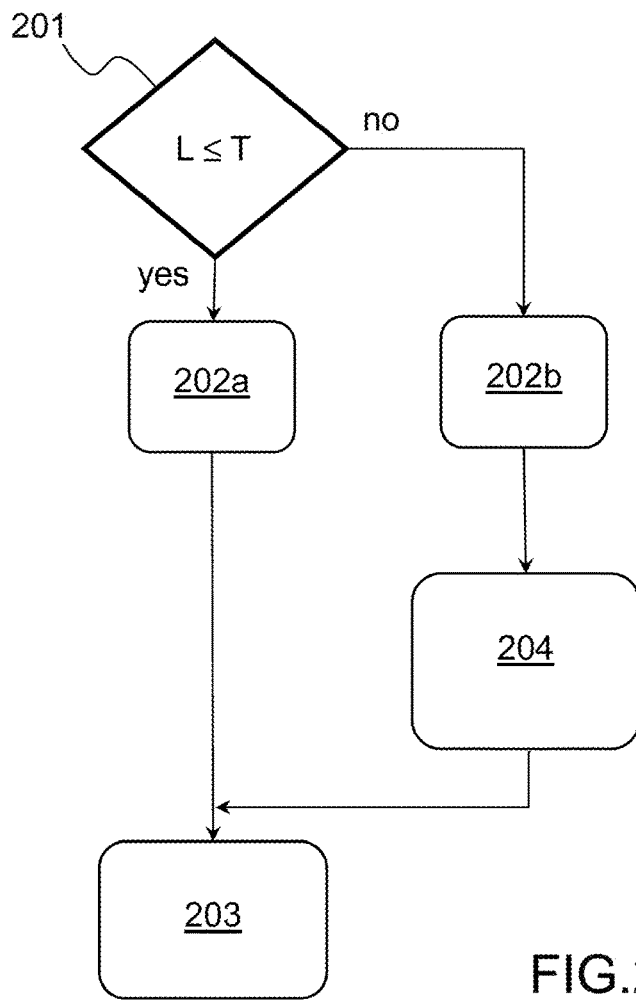
FIG. 2 shows a flowchart of a method for encoding primary shadow memory and secondary shadow memory according to an embodiment of the invention.

FIGS. 1 and 2 show a method for encoding two disjoint shadow memory regions referred as primary and secondary shadow memory regions according to an embodiment of the invention.

Application memory is tracked via these primary and secondary shadow memory regions. This is such, that an application memory block AM is tracked by a pair of shadow memory blocks PSM and SSM belonging to the primary and the secondary shadow regions respectively.

FIG. 1 shows an application memory block AM, a corresponding primary shadow memory block PSM and a corresponding secondary shadow memory block SSM belonging to the primary and the secondary shadow regions respectively.

Let L denote the byte-length of an application block AM. Shadow memory blocks PSM and SSM are used to store metadata concerning application block AM and have the same byte-length L as application block AM As such, each byte in the primary shadow memory block PSM and each byte in the secondary shadow memory block SSM map one corresponding byte in the application memory block AM.

A secondary shadow block SSM is represented by L div $L_{seg}$ fixed length segments followed by L mod $L_{seg}$ trailing bytes, where L is the byte-length of SSM, $L_{seg}$ is the byte-length of a secondary shadow segment, div denotes integer division and mod denotes a modulo operation. In the example shown in FIG. 1, the secondary shadow block SSM is represented by two segments $SSM_{seg1}$ and $SSM_{seg2}$ of $L_{seg}$ bytes each. L mod $L_{seg}$ trailing bytes past segments $SSM_{seg1}$ and $SSM_{seg2}$ are denoted $SSM_{unused}$. Each segment in the secondary shadow block SSM stores two values: the length L of the application memory block AM and an offset from the base address of the segment to the base address of the secondary shadow memory block SSM.

Let $L_{max}$ be the maximal byte-length of a memory block AM that needs to be tracked via shadow memory and $L_{block}$ be the byte-length of a memory block large enough to represent $L_{max}$ in memory. The minimal value of the byte-length $L_{seg}$ of a secondary shadow segment is then $2 \times L_{block}$. That is, a secondary shadow segment should provide enough space to capture the length of the tracked block (i.e., $L_{block}$ bytes) and an offset from the base address of the segment to the base address of the block (another $L_{block}$ bytes). Notably, an application memory block AM of less than $L_{seg}$ bytes in length has no representation in the secondary shadow region. This is because the secondary shadow memory block SSM, corresponding to block AM, does not have enough space for a secondary shadow segment.

A primary shadow memory block PSM tracking an application memory block AM is represented by individual bytes. A byte p in PSM shadowing byte b in AM stores a numeric code indicating one of the following:

if the length of AM is less than $L_{seg}$ (i.e., AM has no secondary shadow representation), the code indicates the length of AM and the byte-offset of b within its block (i.e., AM). Conversion from codes to lengths and offsets is established through a code table which associates a code value with a value denoting the length and the offset. Since a block of length n bytes has exactly n valid offsets ranging from 0 to n−1, for memory blocks whose lengths range from 1 to n bytes one requires $(n^2+n)/2$ values to encode all valid lengths and offsets, if the length of AM is greater than or equals to $L_{seg}$ (length of a secondary shadow segment), the code indicates an offset between a byte corresponding to b in the secondary shadow memory block SSM and the base address of a secondary shadow segment tracking b. Provided that the secondary shadow block may include at most $L_{seg}-1$ trailing bytes, one requires $2 \times L_{seg}-1$ values to encode all required secondary shadow offsets.

According to an embodiment of the invention, blocks whose lengths are less than or equal to some threshold T are represented using only primary shadow blocks, while the blocks whose lengths are greater than T are represented using primary and secondary shadow blocks.

The value of T may vary, however it cannot be less than $L_{seg}$ (since blocks whose lengths are less than $L_{seg}$ cannot be represented by the secondary shadow). Further, a primary shadow byte dedicated to storing a code should be able to encode in an unambiguous manner unallocated memory, all possible offsets and block lengths up to length T, and $2 \times L_{seg}-1$ primary shadow offsets. This presents a limitation since a single byte can capture at most $2^8$ (i.e. 256) values. Notably, a byte carrying code representation may additionally encode other information, for instance it can dedicate 6 bits to storing a code and use remaining bits to store some other data, such as initialization, taint marks or similar. A number of bits in a primary shadow byte which carry a code value is denoted Nb.

In summary, limitations relating to the concrete values of Nb, $L_{seg}$ and T can be expressed using the following system of inequalities:

$$\begin{cases} T + 1 \geq L_{seg} \\ (T^2 + T)/2 + (2 \times L_{seg} - 1) + 1 \leq 2^{Nb} \\ 2 \leq Nb \leq 8 \end{cases}$$

A preferred embodiment of the invention considers tracking memory blocks whose lengths are less than $2^{32}$ bytes (i.e., over 4 gigabytes). While 4 bytes is sufficient to represent a $2^{32}$ number, the size of a secondary shadow segment is chosen to be 8 bytes. That is $L_{block}$ is chosen to be 4 bytes, while $L_{seg}$ is 8 bytes. Further, threshold T is chosen to be 8 bytes, allowing to track any block whose length is less or equal to 8 bytes exclusively via a primary shadow region, while blocks of over 8 bytes in length are tracked via a combination of the primary and secondary shadow regions.

All possible lengths and byte offsets for a memory block of up to 8 bytes in length requires $(T^2+T)/2=(8^2+8)/2=36$ values, while secondary shadow offsets account for $2 \times L_{seg}-1=2 \times 8-1=15$ values. Finally, one value is required to denote unallocated memory.

In this particular example, only the 6 lowest bits of a primary shadow byte are used to express a code whose values range from 0 to 63, such that number 0 denotes a byte which does not belong to an allocated memory block, numbers from 1 to 36 describe lengths and offsets, and numbers from 49 to 63 encode secondary shadow offsets. The $7^{th}$ highest bit is used to denote initialization of a corresponding byte in the application memory and the $8^{th}$ highest bit is left unused.

FIG. 2 describes the steps of a method for encoding a primary shadow memory block PSM and a secondary shadow memory block SSM when an application memory block AM is allocated. The method is based on the encoding scheme which has been detailed in the above paragraphs.

Step 201 of the method shown in FIG. 2 compares the length L of the allocated application memory block AM to the value of threshold T, such that T denotes the maximal size of a memory block tracked exclusively by the primary shadow region.

In the next step (202a or 202b), the Nb lowest bits of each byte in the primary shadow memory block PSM are used to store a code whose value ranges from 0 to $2^{Nb}-1$ according to the result of step 201. In any case, a code value of 0 denotes that the corresponding byte in the application memory does not belong to an allocated memory block.

According to the method, step 202a is executed if the length L of an application memory block AM is less or equal to the threshold T. In this case Nb lower bits of each byte p in the primary shadow block PSM corresponding to a byte b belonging to application memory block AM are filled with a value encoding the byte-length of application memory block AM and a byte offset of b within application memory block AM. Mapping of codes to lengths and offsets is given through a code table which associates codes ranging from 1 to $(T^2+T)/2$ with lengths and offsets.

Following an example, where Nb is 6, and $T=L_{seg}=8$, a code whose value is between 1 and 36 indicates that the tracked byte in the application memory belongs to an allocated memory block whose length is less than or equal to 8 bytes. An example code table mapping codes to lengths and offsets is shown via Table 1. For instance, according to Table 1 code 5 indicates a block length of 3 bytes and a byte-offset of 1, whereas code 27 indicates a length of 7 bytes and an offset of 5 bytes.

In another embodiment, association of codes to lengths and offsets is arbitrary as long as the translation table covers all lengths and offsets for a memory block whose length ranges from 1 to T bytes. That is, a code can be mapped to any valid length and offset.

In yet another embodiment the code table varies in size based on the value of T. For instance, for the case when T is 3, which needs to cover all possible offsets and lengths for a memory block of at most 3 bytes in length, the table consists of only 6 values (1 to 6), whereas for the case when T is 9, the table has 45 values (1 to 45).

TABLE 1

| CODE | BLOCK LENGTH | BYTE OFFSET |
|---|---|---|
| 1 | 1 | 0 |
| 2 | 2 | 0 |
| 3 | 2 | 1 |
| 4 | 3 | 0 |
| 5 | 3 | 1 |
| 6 | 3 | 2 |
| 7 | 4 | 0 |
| 8 | 4 | 1 |

TABLE 1-continued

| CODE | BLOCK LENGTH | BYTE OFFSET |
|---|---|---|
| 9 | 4 | 2 |
| 10 | 4 | 3 |
| 11 | 5 | 0 |
| 12 | 5 | 1 |
| 13 | 5 | 2 |
| 14 | 5 | 3 |
| 15 | 5 | 4 |
| 16 | 6 | 0 |
| 17 | 6 | 1 |
| 18 | 6 | 2 |
| 19 | 6 | 3 |
| 20 | 6 | 4 |
| 21 | 6 | 5 |
| 22 | 7 | 0 |
| 23 | 7 | 1 |
| 24 | 7 | 2 |
| 25 | 7 | 3 |
| 26 | 7 | 4 |
| 27 | 7 | 5 |
| 28 | 7 | 6 |
| 29 | 8 | 0 |
| 30 | 8 | 1 |
| 31 | 8 | 2 |
| 32 | 8 | 3 |
| 33 | 8 | 4 |
| 34 | 8 | 5 |
| 35 | 8 | 6 |
| 36 | 8 | 7 |

Step 202b is executed when the length of application memory block AM is strictly greater than the threshold T. In this case Nb lower bits of each byte p in the primary shadow block PSM corresponding to a byte b belonging to application memory block AM are filled with a value that describes an offset in the secondary shadow block SSM. Let s be a byte in the secondary shadow memory block SSM corresponding to byte b in the application memory block AM. Then the offset encoded by p is the difference between s and the base address of a secondary shadow segment where the length of the application memory block AM and an offset from the base address of the segment to the base address of SSM are stored. As described above, all possible offsets account for $2 \times L_{seg}-1$ values. To encode such an offset the method dedicates $2 \times L_{seg}-1$ highest values which can be stored using Nb bits. These codes range from $(2^{Nb}-2 \times L_{seg}+1)$ to $(2^{Nb}-1)$. To obtain an offset from a code, one needs to subtract $(2^{Nb}-2 \times L_{seg}+1)$ from that code.

Consider a preferred embodiment where Nb is 6, and $T=L_{seg}=8$, thus codes denoting secondary shadow offsets range from 49 to 63. To obtain a secondary shadow offset from a particular code, one needs to subtract 49 from it. For instance, code 49 denotes an offset of 0, code 51 denotes an offset of 2 and code 63 denotes an offset of 14.

In summary, step 201 of the method is executed when a memory block is allocated and it compares length L of the allocated memory block AM with threshold T. Steps 202a and 202b compute a code according to the result of the comparison of step 201 and store the code in the Nb lowest bits of each byte in the primary shadow memory block PSM corresponding to the allocated memory block AM. Codes between 1 and $n_1$ (where $n_1=(T^2+T)/2$) are used when the length of the allocated memory block is less than or equal to threshold T (step 202a) and codes ranging from $n_2$ (where $n_2=2^{Nb}-2 \times L_{seg}+1$) to $2^{Nb}-1$ are used when the length of the allocated memory block is greater than T (step 202b).

In step 203 the (Nb+1)th highest bit of each byte of the primary shadow memory block PSM is used to store initialization status of the corresponding byte in the allocated memory block AM. For example, 0 indicates that the byte is initialized and 1 indicates that the byte is not initialized. The opposite convention can also be chosen. Using an example where Nb is 6, the $7^{th}$ highest bit is used to store initialization status.

The remaining bit or bits of a byte in the primary shadow memory block PSM that are not set in steps 201, 202 and 203 are left unused. For the case when Nb is 6, only the $8^{th}$ highest bit is left unused.

Step 204 of the method only applies if the length of the allocated memory block is greater than T bytes. Step 204 can be executed before or after or simultaneously with step 203. Step 204 consists of encoding the secondary shadow memory block SSM.

A secondary shadow memory block SSM tracks offsets and lengths of an application memory block AM for the case when the byte-length of AM is greater than T bytes. Blocks whose lengths are less than or equal to T bytes are not represented in the secondary shadow region. The secondary shadow memory block SSM is divided into $L_{seg}$-byte segments followed by L mod $L_{seg}$ trailing bytes.

In the example shown via FIG. 1, the application memory block AM has a length of L bytes. The secondary shadow memory block SSM tracking AM has 2 $L_{seg}$-byte segments ($SSM_{seg1}$ and $SSM_{seg2}$) followed by L mod $L_{seg}$ trailing bytes (denoted $SSM_{unused}$).

Each segment in the secondary shadow memory block SSM is split into two $L_{block}$-byte blocks, such that the first (lower) block stores the length of AM and the second (higher) block stores an offset from the base address of the segment to the base address of the shadow block (i.e., SSM).

In another embodiment the length of a secondary shadow segment $L_{seg}$ is greater than $2 \times L_{block}$ bytes. In this case $2 \times L_{block}$ lower bytes of a segment are used to store the length of the tracked application block and an offset from the base address of the segment to the base address of the secondary shadow block, while the trailing $L_{seg} - 2 \times L_{block}$ bytes are unused.

In the example shown via FIG. 1, the first segment $SSM_{seg1}$ is divided into $SEG1_{p1}$ and $SEG1_{p2}$ blocks, such that $SEG1_{p1}$ stores the length of AM (denoted L) and $SEG1_{p2}$ stores the offset (denoted $Offset_1$) from the base address of $SSM_{seg1}$ to the base address of SSM. Similarly, $SSM_{seg2}$ is split into blocks $SEG2_{p1}$ and $SEG2_{p2}$ tracking the length of SSM (L) and the offset (denoted $Offset_2$) from the base address of $SSM_{seg2}$ to the base address of SSM respectively. Note, that since $SSM_{seg1}$ and SSM have the same base address, $Offset_1$ is zero. Further, provided that the length of a secondary shadow segment is fixed and equals to $L_{seg}$, $Offset_2$ is $L_{seg}$.

In alternative embodiments, the length L of the memory block can be replaced by any information indicative of L. For example, it can be a value from which the length L can be directly deduced. This information can also be encoded or encrypted to give access only to authorized users.

Similarly, the offset from the base address of the segment to the base address of the block can also be replaced by any information indicative of the offset value.

Figure 3:
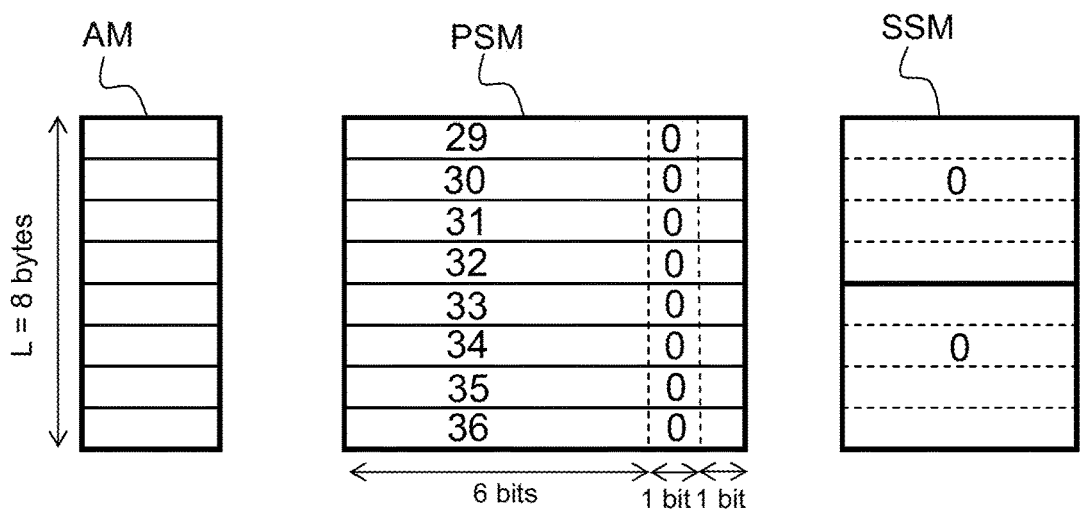
FIGS. 3 and 4 show a representation of primary shadow memory and secondary shadow memory for two different numerical examples.
Figure 4:
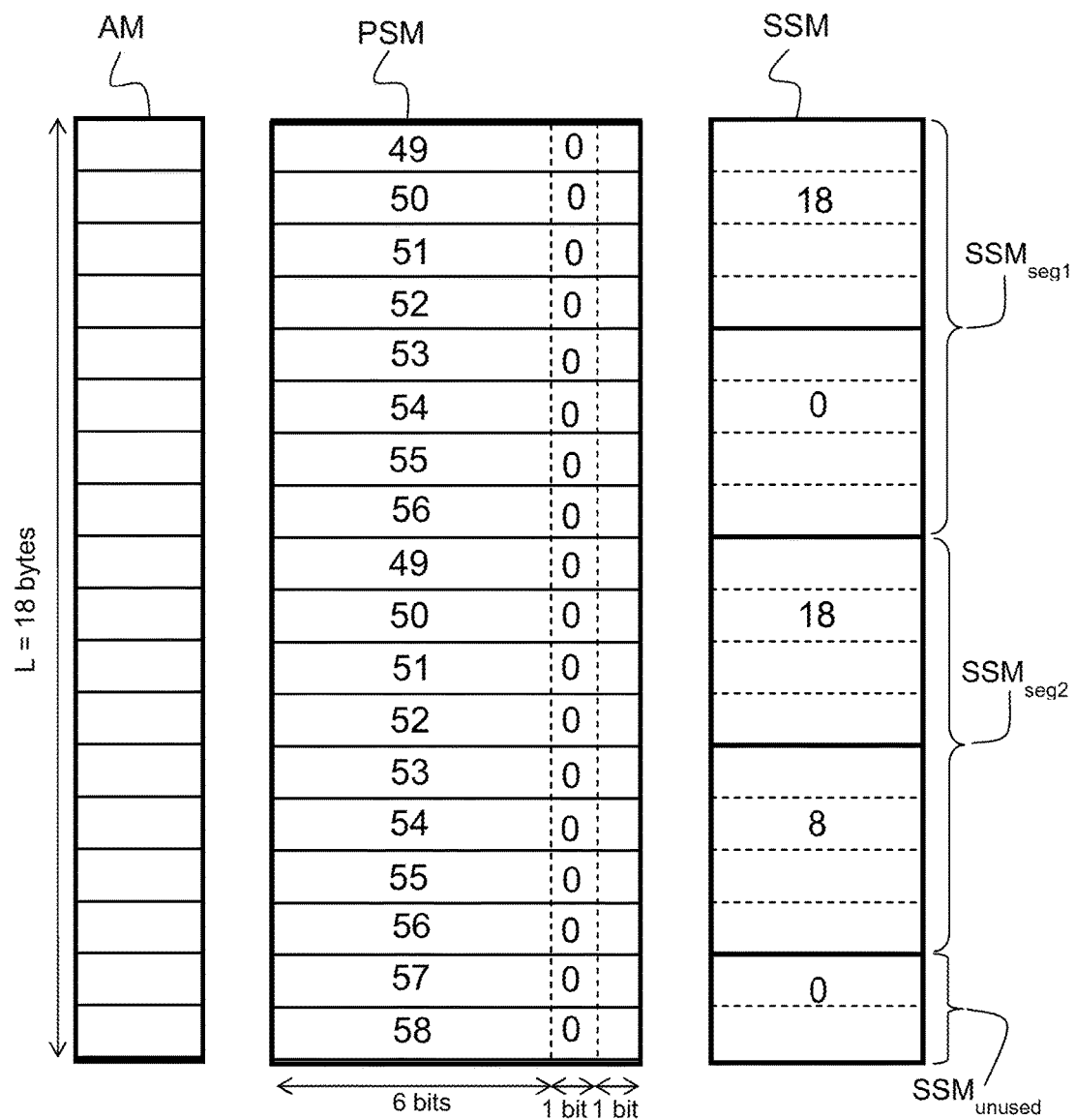

FIGS. 3 and 4 show a representation of primary and secondary shadow memories for two different numerical examples.

In both examples Nb is 6, $T = L_{seg} = 8$, $L_{block}$ is 4 and the code table used is the one shown via Table 1.

FIG. 3 shows shadow state encoding of an uninitialized application memory block AM of 8 bytes in length using the primary shadow block PSM. In this example, PSM is filled with values ranging from 29 to 36 corresponding to codes denoting block length of 8 bytes and offsets ranging from 0 to 7. The $7^{th}$ highest bit of each byte is set to 0 indicating that all bytes in AM are not initialized. Since the length of AM is 8 bytes (less than the threshold T), AM has no representation in the secondary shadow region.

FIG. 4 shows shadow state encoding of an application memory block AM of 18 bytes in length using the primary and the secondary shadow blocks PSM and SSM respectively. In this example, the primary shadow memory block PSM is filled with values ranging from 49 to 58. Code value of a byte p in PSM captures an offset from a corresponding byte s in SSM to the base address of the nearest SSM segment of $L_{seg}$ bytes in length. In this particular example, offsets can be obtained from code values by subtracting 49 from them. Therefore, code values ranging from 49 to 58 denote offsets ranging from 0 to 9. The first 8 bytes of the primary shadow memory block PSM are filled with code values ranging from 49 to 56. These values encode offsets to the base address of the first 8-byte segment (denoted $SSM_{seg1}$) in the secondary shadow memory block SSM. The second 8 bytes of the primary shadow memory block PSM are also filled with code values ranging from 49 to 56. These values encode offsets to the base address of the second 8-byte segment (denoted $SSM_{seg2}$) in the secondary shadow memory block SSM. Finally, the last two bytes of PSM, which correspond to two trailing unused bytes following segments $SSM_{seg1}$ and $SSM_{seg2}$ (denoted $SSM_{unused}$) capture code values 57 and 58, which also encode offsets to the base address of the second 8-byte segment in the secondary shadow block SSM.

Figure 5:
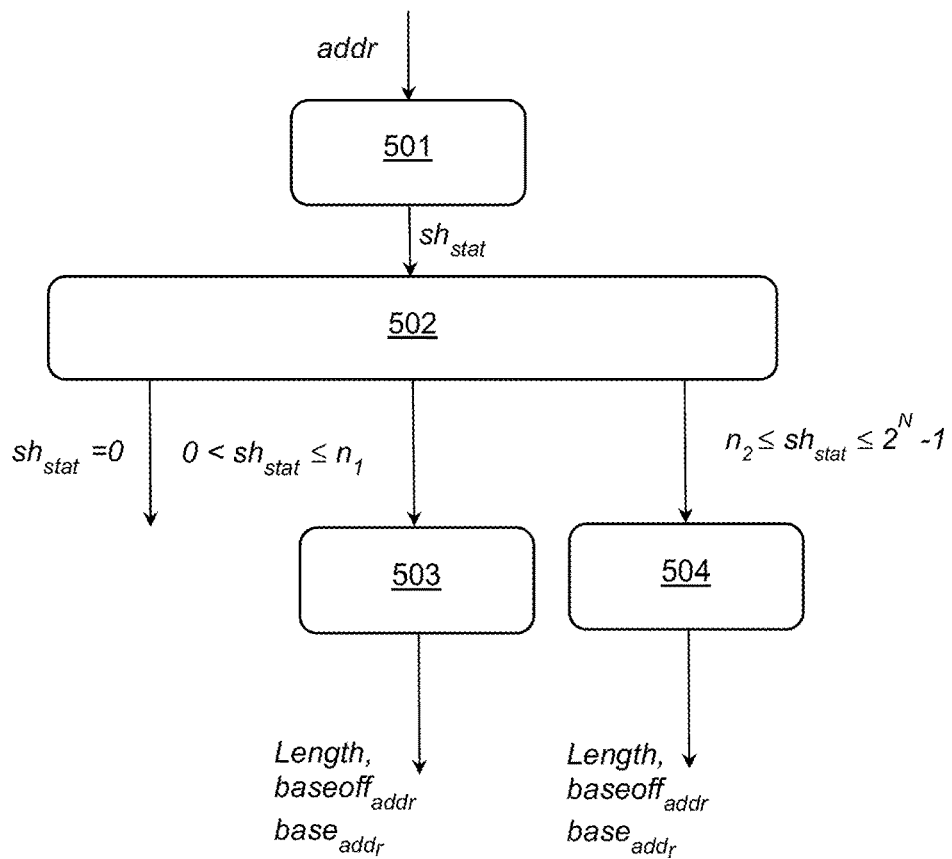
FIG. 5 shows a flowchart of a method for determining properties of a memory address by using primary or secondary shadow state memory according to another embodiment of the invention.

Generally speaking code values greater than or equal to a value $n_2$ are used to indicate that a byte belongs to a memory block of over 8 bytes in length (in the above example, $n_2 = 49$), then all 8-bytes segments of the primary shadow memory block PSM (corresponding to 8-bytes segments in the secondary shadow memory block SSM) are filled with values ranging from $n_2$ to $n_2 + 7$. The L mod $L_{seg}$ bytes of the primary shadow memory block PSM, are filled with values ranging from $n_2 + 8$ to $n_2 + 8 + (L \bmod L_{seg}) - 1$. FIG. 5 shows a method for determining properties of a memory address by using shadow state encoding according to an embodiment of the invention discussed earlier.

Let addr be an address belonging to a memory block AM shadowed as described above. Let $Shadow_{primary}(a)$ be a mapping translating an application memory address a into a corresponding shadow address in the primary shadow region, $Shadow_{secondary}(a)$ be a mapping translating an application memory address a into a corresponding shadow address in the secondary shadow region, $Uspace_{primary}(s)$ be a mapping translating a primary shadow address s into a corresponding application memory address, $Uspace_{secondary}(s)$ be a mapping translating a secondary shadow address s into a corresponding application memory address, ReadStat(a) denote reading a number stored in the Nb lower bits of the byte at the memory address a, and ReadInt(a) denote reading a number stored in the $L_{block}$ bytes starting at address a.

The memory block related properties of address addr, namely the length of the memory block addr belongs to, the base address of that block and the byte offset of addr within this block are computed via the execution of the method depicted in FIG. 5.

In the first step 501 of the method, the Nb lowest bits of the byte of a primary shadow memory block PSM corresponding to the byte addr refers to, are read to extract a code value:

$$sh_{stat}=\text{ReadStat}(\text{Shadow}_{primary}(\text{addr}))$$

In a next step 502 of the method, the extracted code ($sh_{stat}$) is analyzed to distinguish between three different cases.

First, if the code value $sh_{stat}$ equals 0, the method concludes that addr belongs to unallocated memory space. The value 0 is a preferred value for encoding an unallocated memory state, therefore any other value can be used as far as the correspondence between this value and an unallocated memory state is defined.

Second, if the code value $sh_{stat}$ is between 1 and a first value $n_1$, then a next step 503 is executed where the length of the memory block Length and the byte offset $baseoff_{addr}$ of addr are obtained from the code table. The base address of the tracked memory block can be obtained by subtracting byte offset $baseoff_{addr}$ from address addr.

The first value $n_1$ corresponds to the greatest value encoding the length and the byte offset for a memory block whose length is less than threshold T in the code table. In the preferred embodiment, where T is 8 bytes, $n_1$ is 36. However, $n_1$ can denote a different value if the code table is different from the one shown via Table 1.

Third, if the code value is between a second value $n_2$ and $2^{Nb}-1$ (where $n_2$ is the least value used to denote a secondary shadow offset), then addr is determined to belong to a memory block of more than T bytes in length and step 504, comprising the following sub-steps, is executed.

In a preferred embodiment, the second value $n_2$ is equal to 49 but it could also be a different value.

The step 504 consists in executing the following operations.

First, the base address $Sh_{secondary}$ of a secondary shadow segment addr corresponds to is computed by:

$$Sh_{secondary}=\text{Shadow}_{secondary}(\text{addr})-(Sh_{stat}-n_2)$$

The result $Sh_{secondary}$ of this operation is the base address of a segment of the secondary shadow memory block SSM.

Then, the length of the memory block addr belongs to is obtained by reading the $L_{block}$ bytes starting at the base address of the segment:

$$\text{Length}=\text{ReadInt}(sh_{secondary})$$

Then, the base address of the memory block addr belongs to is computed by reading the offset value in the $L_{block}$ higher bytes of the secondary shadow segment, subtracting that offset value from the base address of the segment and converting the obtained secondary shadow memory address to application memory:

$$base_{addr}=U\text{Space}_{secondary}(Sh_{secondary}-\text{ReadInt}(Sh_{secondary}+L_{block}))$$

Finally, the byte offset of addr within its block is computed by subtracting the base address of the memory block from address addr.

$$baseoff_{addr}=\text{addr}-base_{addr}$$

The method depicted in FIG. 5 can be used to determine properties of an address addr including the length of the memory block that address addr belongs to, the base address of that memory block and the offset of address addr within the memory block.

These properties can then be used to detect memory safety problems including illegal or improper access through address addr to a memory location.

An example of illegal memory access is a pointer trying to access a memory location that was not properly allocated. An example of improper memory access is an access to a properly allocated memory location through a pointer which does not directly point to a memory block containing that location. Knowing the boundaries of the memory block the pointer references and the byte offset of the pointer within this block allows detecting these particular problems.

Figure 6:
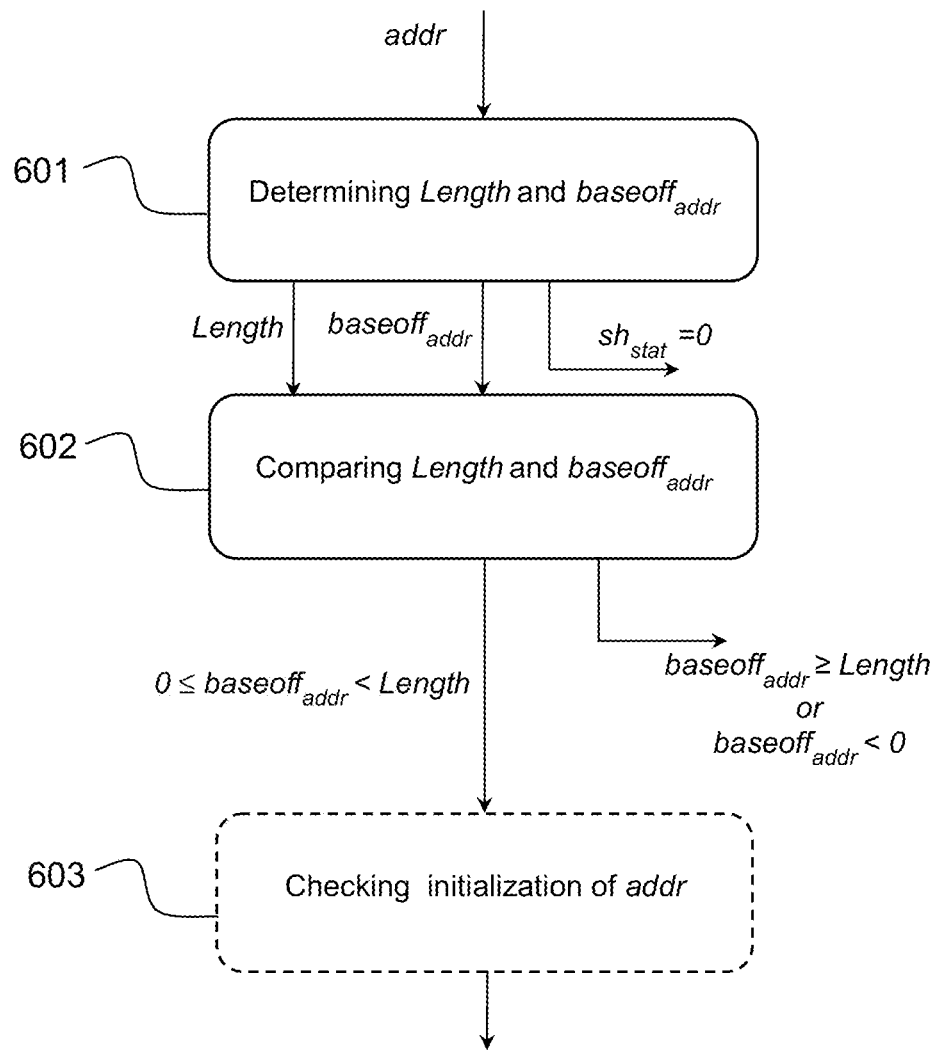
FIG. 6 shows a flowchart of a method for detecting illegal access of memory by a program according to another embodiment of the invention.

FIG. 6 shows a flowchart of an example of a method for detecting illegal or improper access of memory by a program. In this example, a program tries to access a memory location at address addr.

In a first step 601, properties of address addr are computed according to the method shown in FIG. 5. Step 502 of the method is executed with a test of the code value $Sh_{stat}$ read in the primary shadow memory block. If this value is equal to 0, the method is terminated and step 601 concludes that address addr corresponds to an unallocated memory location. If the code value is not equal to 0, then it means that address addr is in a memory block that was properly allocated. The method then turns to step 602 in which the offset of address addr within the memory block is compared to the length of the memory block. If the offset $baseoff_{addr}$ is less than the length of the memory block but greater than or equal to zero, then the method concludes that address addr belongs to a memory block that was allocated. If the offset $baseoff_{addr}$ is negative or it is equal to or larger than the length of the memory block, then method concludes that the program is trying to access an unallocated memory block.

According to an alternative embodiment of the method of FIG. 6, if the program accesses an address of the form addr+offset, then step 602 can be modified to compare the length of the memory block addr belongs to with $baseoff_{addr}$+offset to determine memory violation problems related to improper memory access. In this case, if $baseoff_{addr}$+offset is greater or equal to the length of the memory block addr belongs to or less than zero, the method can conclude that an illegal access to memory location addr+offset is being performed.

If step 602 concludes with no memory safety problem, then in an optional step 603, the method performs initialization check of address location addr by reading the value of the corresponding bit (the $7^{th}$ bit in the examples in FIGS. 3-4) in the byte of the primary shadow memory block shadowing address addr. The result is compared with the value used to store initialization information in the primary shadow memory. For example, a value of 1 may mean that the corresponding byte in the application memory was properly initialized. An initialization check of address addr can be performed in case of a read access to this address. A write access to this location is authorized while a read access is not. When writing in an uninitialized location addr, checking the safety of the write access should be successful, but next an additional step of the method should be performed to modify the shadow memory to store that addr is now initialized.

Figure 7:
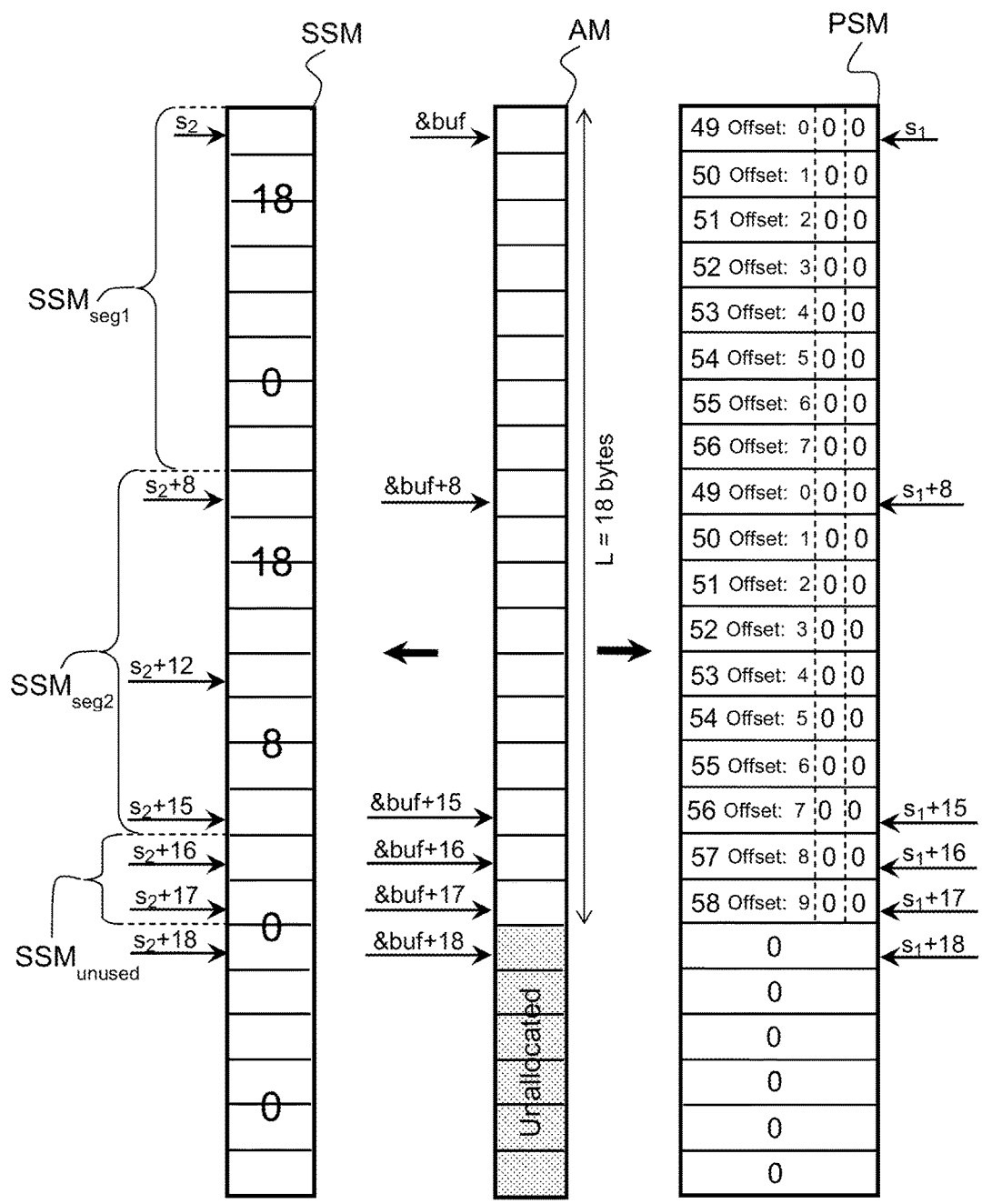
FIG. 7 shows a first example of application of the invention for detecting illegal memory access.

FIG. 7 shows a first example of application of the invention for detecting an illegal memory access. This example refers to the execution of the C program shown via Listing 1. The program shows a memory safety violation involving writing past the bounds of a stack-allocated buffer.

| Listing 1 |
|---|
| 1    int main(int argc, char **argv) {<br>2        char buf[18];<br>3        int i;<br>4        for (i = 0; i < argc; i++)<br>5            buf[i] = '0';<br>6    } |

The program in Listing 1 first declares a stack buffer buf of 18 bytes at Line 2 and further fills it with zeroes using a loop at Lines 4-5. Note, that since on a program's stack memory allocation is automatic, declaration of buf is equivalent to allocating a memory block of 18 bytes.

The program shown via Listing 1 is unsafe. Since the length of buf is 18 bytes, its legal subscripts range from 0 to 17. For the case when integer argc (which captures the number of program arguments during a program's invocation) is strictly greater than 17, the assignment at Line 5 writes zeroes to stack memory locations outside of the program's stack allocation. This type of vulnerability is often referred to as buffer overflow.

The example considers a preferred embodiment where Nb is 6, $L_{block}$ is 4 bytes and $T=L_{seg}=8$. That is, 6 lower bits of a byte in a primary shadow region capture a number ranging from 0 to 63 that either encodes a length and a byte-offset of the corresponding byte of the application memory, or an offset relative to a location in the secondary shadow. Further, the length of a secondary shadow segment is 8 bytes and the threshold T is also 8 bytes, i.e., blocks whose length is less than or equal to 8 bytes are tracked exclusively by the primary shadow region and blocks whose length is over 8 bytes are tracked via a combination of the primary and the secondary shadow regions. Each secondary shadow segment of 8 bytes is represented by two 4-byte blocks that capture the length of the tracked application block and an offset from the base address of that segment to the base address of the shadow block. In other words, the size of the segment is $2 \times L_{block}$, where $L_{block}$ is 4 bytes.

Representation of an automatically allocated memory block AM of 18 bytes captured by the stack buffer buf is shown via FIG. 7. Since the block AM is over 8 bytes in length, it is tracked by two 18-byte shadow blocks: PSM and SSM in the primary and the secondary shadow regions respectively. Let $s_1$ denote the base address of PSM and $s_2$ denote the base address of SSM. The secondary shadow memory block SSM has two segments $SSM_{seg1}$ and $SSM_{seg2}$ of 8-byte length each and 2 unused trailing bytes (denoted $SSM_{unused}$). Segment $SSM_{seg1}$ in the secondary shadow memory block SSM (shown on the left in FIG. 7) stores the length of the tracked memory block (i.e., 18 bytes) in its 4 lower bytes and an offset from the base address of the segment $SSM_{seg1}$ to the base address of the shadow block in its 4 higher bytes (i.e., 0 because the base address of SSM is also the base address of $SSM_{seg1}$). Similarly, segment $SSM_{seg2}$ stores number 18 in its 4 lower bytes (i.e., the length of the tracked block AM) and an offset of 8 in its 4 higher bytes. The remaining 2 bytes are unused and filled with zeroes.

6 lower bits of each byte in the 18-byte memory block PSM in the primary shadow (shown on the right in FIG. 7) stores a value ranging from 49 to 58. These values indicate that an application memory block AM tracked via PSM is over 8 bytes in length. Further, a value stored via a byte p in PSM encodes an offset from a corresponding byte s in the secondary shadow segment to the base address of that segment. The segment stores the length of the application block AM in its 4 lower bytes and an offset from the base address of that segment to the base address of the secondary shadow block SSM in its 4 higher bytes. A secondary shadow offset encoded via a primary shadow byte can be obtained from the stored value by subtracting 49 from it. For instance, 49 denotes an offset of 0, 50 denotes an offset of 1, 51 denotes an offset of 2, and so on.

Finally, a byte in the primary shadow memory block PSM tracks initialization of the corresponding byte in the application's memory (via its 7$^{th}$ highest bit) and the 8$^{th}$ highest bit is left unused.

Consider the program in Listing 1 run with 19 arguments. In this case the value of argc is 19 and the program executes assignment buf[18]='0' resulting in a buffer overflow.

Detecting whether buf[18]='0' writes to unallocated memory can be achieved by applying the method shown in FIG. 5. Step 501 is executed by looking up the value mapped to address &buf[18] in the primary shadow memory block PSM (i.e., indicated via $S_1$+18 in FIG. 7). The value stored in the 6 lowest bits of $S_1$+18 is zero, therefore the stack location at address &buf[18] lies outside of the program's stack allocation and consequently assignment buf[18]='0' leads to a memory violation.

Consider assignment buf[15]='0'. Since the length of buf is 18 bytes, execution of buf[15]='0' accesses allocated memory on a program's stack and therefore does not result in a memory violation. The validity of this assignment and the block level properties of the memory block location &buf[15] belongs to can be computed by executing the method shown in FIGS. 5 and 6.

First, the value stored in the primary shadow mapped to &buf[15] is read (step 501):

$$Sh_{stat} = ReadStat(Shadow_{primary}(\&buf[15])) = 56$$

This value is then compared with code value 49 (step 502) to conclude that the allocated memory block is greater than 8 bytes in length.

Then step 504 is executed to determine the properties of the allocated memory block AM.

The base address of the secondary shadow segment corresponding to address &buf[15] is computed via:

$$\begin{aligned}sh_{secondary} &= Shadow_{secondary}(\&buf[15]) - (56 - 49)\\ &= Shadow_{secondary}(\&buf[15]) - 7\\ &= Shadow_{secondary}(\&buf[15] - 7)\\ &= Shadow_{secondary}(\&buf[8])\end{aligned}$$

Notably, $Shadow_{secondary}(\&buf[8])$ corresponds to the base address of $SSM_{seg2}$ (indicated via $s_2$+8 in FIG. 7).

The length of the memory block &buf[15] belongs to is determined by reading the value stored in the 4 lower bytes of the secondary shadow segment SSM $$\begin{aligned}Length &= ReadInt(sh_{secondary})\\ &= ReadInt(Shadow_{secondary}(\&buf[8]))\\ &= 18\end{aligned}$$

Then, the offset relative to the base address of the secondary shadow segment $SSM_{seg2}$ is computed:

$$baseoff_{sh} = ReadInt(sh_{secondary} + 4)$$
$$= ReadInt(Shadow_{secondary}(\&buf[8]) + 4)$$
$$= ReadInt(Shadow_{secondary}(\&buf[8] + 4))$$
$$= ReadInt(Shadow_{secondary}(\&buf[12]))$$
$$= 8$$

Then, the base address of the memory block &buf[15] belongs to is determined from:

$$base_{addr} = Uspace_{secondary}(sh_{secondary} - baseoff_{sh})$$
$$= Uspace_{secondary}(Shadow_{secondary}(\&buf[8]) - 8)$$
$$= \&buf$$

Finally, the byte offset of &buf[15] within its block AM can be computed:

$$baseoff_{addr} = \&buf[15] - base_{addr}$$
$$= \&buf[15] - \&buf$$
$$= 15$$

By applying the method for detecting illegal access of memory by a program, as depicted in FIG. 6, one can check that assignment buf[15]='0' is not an illegal access.

Precisely, the length of the allocated memory block AM has been determined to be equal to 18 bytes and the byte offset of &buf[15] within the block AM is 15 (step 601).

Comparing computed length and byte offset (step 602) leads to the conclusion that the byte offset of &buf[15] is less than the length of the allocated memory block AM but greater than zero and therefore, assignment buf[15]='0' is not an illegal access.

Initialization of address &buf[15] can be checked by reading the $7^{th}$ bit of byte at address $s_1+15$ in the primary shadow memory block PSM.

Figure 8:
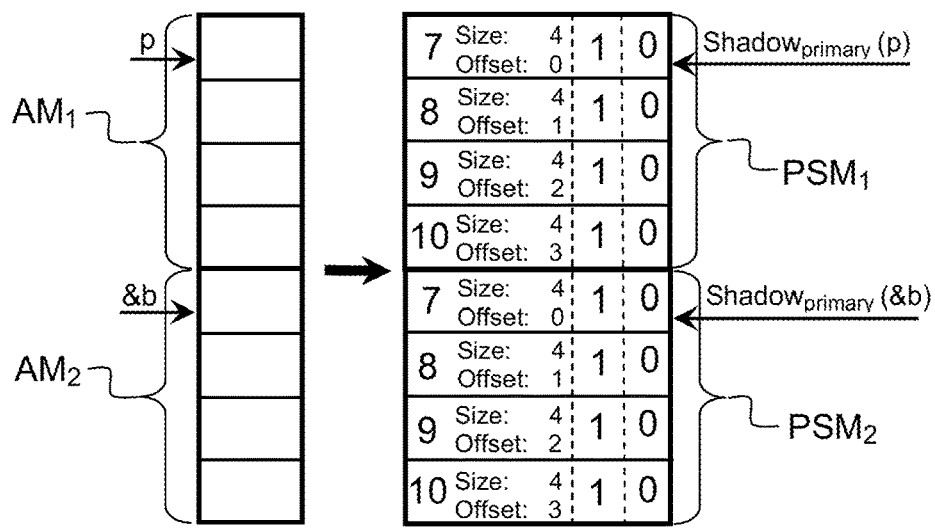
FIG. 8 shows a second example of application of the invention for detecting improper memory access.

FIG. 8 shows the second example of application of the invention for detecting improper use of stack-allocated memory. This example refers to the execution of the C program shown in Listing 2.

| Listing 2 |
| --- |
| 1    int main(int argc, char **argv) |
| 2         int a = 1; |
| 3         int b = 2; |
| 4         int *p = &a; |
| 5         *(p + 1) = 3; |
| 6    } |

The program of Listing 2 is an example showing a scenario involving improper use of allocated stack memory, where an allocated memory location is modified through a pointer which references a memory block that does not contain that location.

The program shown via Listing 2 first declares two integers (a and b) and further aliases the memory block containing the value of a using pointer p. Since stack memory blocks are allocated automatically via variable declarations, variables a, b and p are represented by 4-byte memory blocks on the program's stack.

The example uses the same preferred embodiment of the invention as Example 1, that is Nb=6, $T=L_{seg}=8$ and $L_{block}=4$. Code table is given via Table 1.

At Line 5 of Listing 2, the program uses pointer arithmetic to modify the value of b via pointer p which references a (therefore addresses given via &a and p are the same). In a typical program, stack blocks are not padded, therefore blocks holding the values of a and b are adjacent. During a typical execution assignment *(p+1)=3; violates memory safety using p to write 4 bytes past the bounds of the memory block it points to.

Such an issue cannot be detected using byte-level shadowing techniques because even though assignment *(p+1)=3; writes past the bounds of the block pointed to by p, this memory access is performed on a properly allocated stack block (in this instance given by b).

The shadow state encoding of stack blocks $AM_1$ and $AM_2$ corresponding to variables a and b is shown via FIG. 8.

Both blocks $AM_1$ and $AM_2$ are 4 bytes long and therefore represented using only the primary shadow memory region. The two primary shadow memory blocks $PSM_1$ and $PSM_2$ are represented on the right of FIG. 8.

Code values carried by the 6 lowest bits of bytes in the primary shadow memory blocks $PSM_1$ and $PSM_2$ capture block lengths and byte offsets of the corresponding bytes in the application's memory blocks $AM_1$ and $AM_2$.

Interpretation of the code values is given via Table 1. The $7^{th}$ bit of each byte in the shadow is set to 1 indicating that the memory blocks holding a and b have been initialized.

To detect an overflow via assignment *(p+1)=3; at Line 5 (Listing 2) it is sufficient to show that writing to the $5^{th}$ byte starting from address p results in modification of memory past the bounds of the block $AM_1$ pointed to by p. This is because p is an integer pointer, therefore (p+1) indicates a memory location that is 4 bytes past the address of p. The buffer overflow can be detected by executing the method according to the invention as shown in FIGS. 5 and 6.

First, the byte mapped to the address of p in the corresponding primary shadow memory block $PSM_1$ is read (step 501).

The code value stored in the 6 lowest bits of the byte is 7 and is compared to 36 (maximum value of the code table). The result of this comparison is that the memory block $AM_1$ has a length smaller than 8 bytes (step 502).

Then, the length of block $AM_1$ and the byte offset of p within this block is determined from the code table (step 503). The result is that p belongs to a block of 4 bytes in length and that the byte offset of p within its block is 0 (see Table 1).

Since the stack memory block $AM_1$ pointed to by p is only 4 bytes long, writing to the $5^{th}$ byte starting from p modifies the location past the bounds of a memory block that p points to (step 602). This detects an overflow error writing past the bounds of a stack-allocated buffer.

Although the various embodiments of the invention have been described in relation to two particular examples of memory safety violations occurring in the C programming language, it should be noted that the invention can be applied to various memory safety issues including heap overflow errors, double free violations, null pointer dereferences. Also, all the embodiments of the invention are not limited to the C programming language but also apply to other programming languages such as C++. The invention can be implemented using source-level instrumentation or binary instrumentation. The invention provides a shadow memory encoding scheme that allows determining properties related to boundaries of allocated memory blocks. These properties can then be used to detect memory safety problems. In some embodiments of the invention, detection of a memory safety problem can trigger a message to the developer at runtime. As such, the invention can be included in a debugging tool for use by programmers.

Additional advantages and modifications will readily appear to those skilled in the art. The invention in its broader aspects is therefore not limited to the specific details, representative methods, and illustrative examples shown and described.

Figure 9:
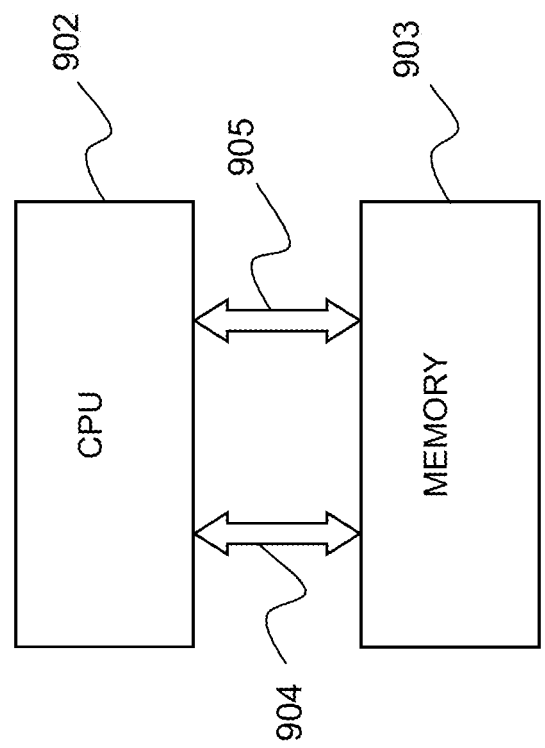
FIG. 9 shows a generic computing system suitable for implementing embodiments of the invention.
Figure 9:
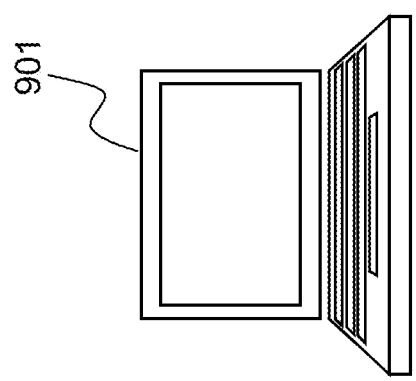

FIG. 9 shows a generic computing system suitable for implementing embodiments of the invention comprising a computer 901 or any equivalent computing system. The system 901 comprises a processor 902 and a memory 903. The processor 902 can be a single central processing unit (CPU), or alternatively include multiple processors or cores. The processor can be a 32-bit or 64-bit processor or any equivalent. Computer 901 can be a personal computer, mainframe computer, server or any other computing device. The processor 902 can be any type of device capable of manipulating or processing information. The processor 902 can be, for example, a quantum processor or a general purpose processor or a special purpose processor or an application-specific integrated circuit, programmable logic arrays, programmable logic controller, microcode, firmware, micro-controller, microprocessor, digital signal processor, or any combination of the foregoing, this list being given for a purely illustrative purpose and is not a limitation to the scope of the invention.

Memory 903 can be random access memory (RAM) or any other suitable type of storage device. Generally processor 902 receives program instructions and data from the memory 903 which can be used by processor 902 to perform the embodiments of the invention. Memory 903 can be arranged through a virtual memory space and include heap memory but also stack memory. Memory 903 can be in the same unit as processor 902 as shown or can be located in a separate unit that is coupled to processor 902. Processor 902 can access specific locations in memory by placing the location's address onto an address bus 904. The contents in the specified location of memory 903 are then accessed by processor 902 on a data bus 905. Memory 903 is virtualized so that application programs running on processor 902 can address a virtual memory space as opposed to physical locations within memory 903. The operating system of computer 901 manages this virtual memory space.

Figure 10:
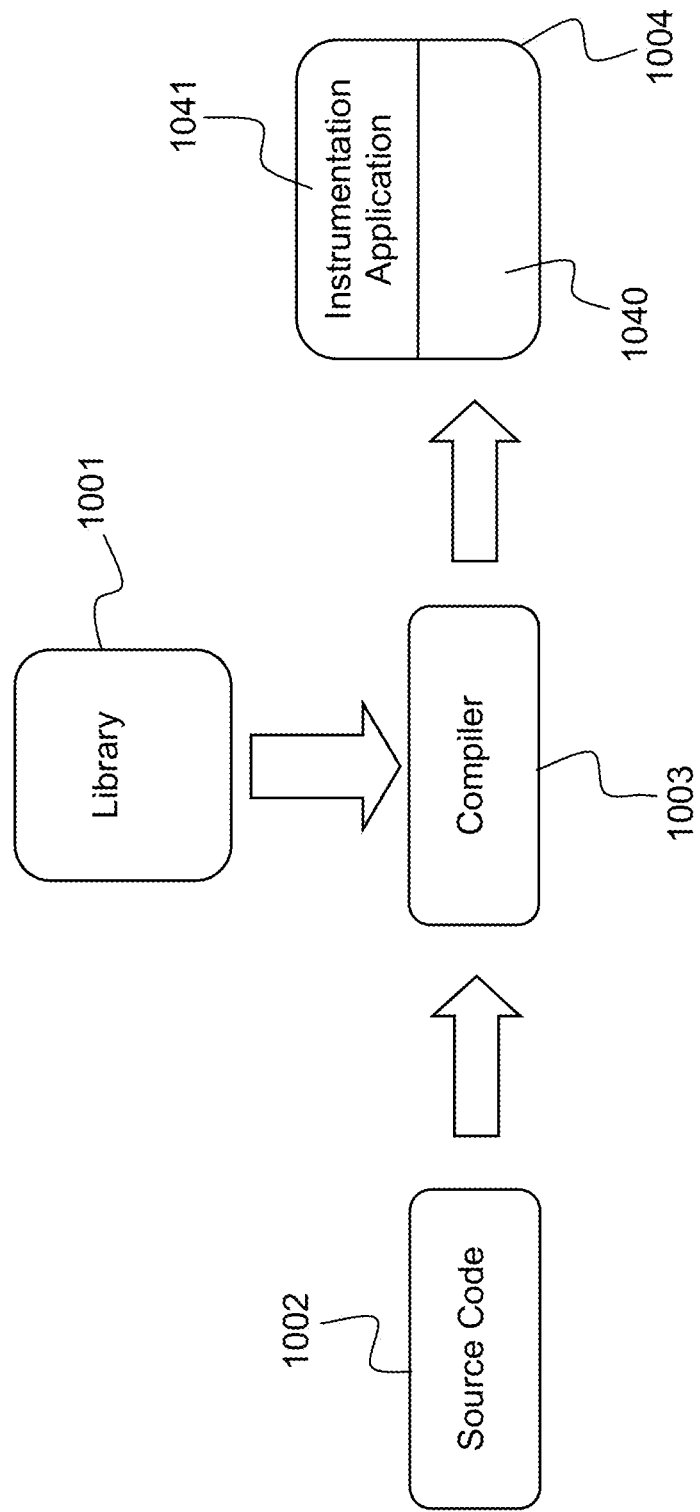
FIG. 10 shows a block diagram of a system including a compiler and instrumentation for performing embodiments of the invention.

FIG. 10 is a block diagram of a system including a compiler 1003 that accepts source code 1002 as input and generates executable code 1004 as output. Executable code 1004 includes instrumentation code 1041 used in performing embodiments taught herein, such as methods depicted in FIGS. 5 and 6. Source code 1002 can be generated by a human programmer using a text editor or programming tool. Code for creating instrumentation code 1041 is contained in a library 1001 that is accessible by compiler 1003. Library 1001 is also called run-time library herein. Executable code 1004 generated by compiler 1003 includes compiled application code 1040, also called the application program, into which instrumentation code 1041 is inserted. Out-of-bounds accesses to heap memory objects, initialization issues or improper access to allocated memory can be detected using embodiments described herein.

The system depicted in FIG. 10 can be executed by the processor 902 of the computing system 901. In another embodiment, the system of FIG. 10 can be implemented through instrumentation added before the source code is passed to a compiler. In yet another embodiment, the instrumentation can be performed at a binary level, i.e., after compilation.

Generally, all embodiments of the invention can be implemented as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

REFERENCES

[1] R. Hastings and B. Joyce. Purify: Fast detection of memory leaks and access errors. In Proceedings of the Winter USENIX Conference, pages 125-136, January 1992.
[2] J. Seward and N. Nethercote. Using valgrind to detect undefined value errors with bit-precision. In Proceedings of the USENIX Annual Technical Conference, pages 17-30. USENIX, 2005.
[3] W. Cheng, Q. Zhao, B. Yu, and S. Hiroshige. Tainttrace: Efficient flow tracing with dynamic binary rewriting. In Proceedings of the IEEE Symposium on Computers and Communications, pages 749-754. IEEE Computer Society, June 2006.
[4] D. Bruening and Q. Zhao. Practical memory checking with Dr. Memory. In Proceedings of the Annual IEEE/ACM International Symposium on Code Generation and Optimization, CGO '11, pages 213-223, Washington, D.C., USA, 2011. IEEE Computer Society.
[5] K. Serebryany, D. Bruening, A. Potapenko, and D. Vyukov. AddressSanitizer: A fast address sanity checker. In Proceedings of the USENIX Annual Technical Conference, pages 309-319. USENIX Association, June 2012,
[6] Q. Zhao, D. Bruening, and S. P. Amarasinghe. Umbra: Efficient and scalable memory shadowing. In Proceedings of the International Symposium on Code Generation and Optimization, pages 22-31. ACM, April 2010.

The invention claimed is:

1. A computer-implemented method for encoding an application memory that a program, executed on a computer, has access to, using a shadow memory corresponding to the application memory, the method comprising:
creating and initializing a primary shadow memory, each byte in the application memory being mapped to a corresponding byte in the primary shadow memory, for each memory block in the application memory that the program allocates, encoding a corresponding primary shadow memory block, in the primary shadow memory, by:
  comparing the length L of the memory block with a predetermined value T and, if L is smaller or equal to T,
  for each byte p in the primary shadow memory block corresponding to a byte b in the application memory block, writing in Nb bits of the byte p, Nb being an integer, a first code value that encodes the length of the memory block and the offset of the byte b within the memory block,
creating and initializing a secondary shadow memory, each byte in the application memory being mapped to a corresponding byte in the secondary shadow memory,
for each memory block in the application memory that the program allocates, comparing the length L of the memory block with a predetermined value T and, if L is greater than T:
  defining a corresponding secondary shadow memory block, in the secondary shadow memory, being divided into segments having all equal sizes and trailing bytes,
  encoding a corresponding primary shadow memory block, in the primary shadow memory, by, for each byte of the primary shadow memory block, writing, in Nb bits of the byte, a second code value that encodes an offset between a corresponding byte in a secondary shadow memory block and a base address of a segment in the secondary shadow memory block,
  encoding the secondary shadow memory block, by:
    writing in a first part of each segment, a value indicative of the length of the memory block,
    writing in a second part of each segment, a value indicative of the offset from the base address of the segment to the base address of the secondary shadow memory block.

2. The computer-implemented method for encoding an application memory of claim 1 wherein the first code value ranges from 1 to a first predetermined value $n_1$ and the second code value ranges from a second predetermined value $n_2$ to $2^{Nb}-1$.

3. The computer-implemented method for encoding an application memory of claim 2 wherein the first predetermined value $n_1$ equals 36 and the second predetermined value $n_2$ equals 49.

4. The computer-implemented method for encoding an application memory of claim 1 wherein Nb is equal to 6.

5. The computer-implemented method for encoding an application memory of claim 1 wherein T is equal to 8 bytes.

6. The computer-implemented method for encoding an application memory of claim 1 comprising for each byte of the primary shadow memory block, assigning, to one bit of the byte, a value indicative of the initialization of the corresponding byte in the memory block.

7. The computer-implemented method for encoding an application memory of claim 1 wherein the application memory comprises stack memory.

8. A computer-implemented method for detecting illegal memory access by a program executed on a computer having a processor and an application memory, the method comprising:
  encoding an application memory that the program has access to, using a shadow memory corresponding to the application memory, by:
    creating and initializing a primary shadow memory, each byte in the application memory being mapped to a corresponding byte in the primary shadow memory,
    for each memory block in the application memory that the program allocates, encoding a corresponding primary shadow memory block, in the primary shadow memory, by:
      comparing the length L of the memory block with a predetermined value T and, if L is smaller or equal to T,
      for each byte p in the primary shadow memory block corresponding to a byte b in the application memory block, writing in Nb bits of the byte p, Nb being an integer, a first code value that encodes the length of the memory block and the offset of the byte b within the memory block,
    creating and initializing a secondary shadow memory, each byte in the application memory being mapped to a corresponding byte in the secondary shadow memory,
    for each memory block in the application memory that the program allocates, comparing the length L of the memory block with a predetermined value T and, if L is greater than T:
      defining a corresponding secondary shadow memory block, in the secondary shadow memory, being divided into segments having all equal sizes and trailing bytes,
      encoding a corresponding primary shadow memory block, in the primary shadow memory, by, for each byte of the primary shadow memory block, writing, in Nb bits of the byte, a second code value that encodes an offset between a corresponding byte in a secondary shadow memory block and a base address of a segment in the secondary shadow memory block,
    encoding the secondary shadow memory block, by:
      writing in a first part of each segment, a value indicative of the length of the memory block,
      writing in a second part of each segment, a value indicative of the offset from the base address of the segment to the base address of the secondary shadow memory block, and,
  when the program accesses to an address in an application memory block, analyzing the primary shadow memory block to determine if the access is illegal.

9. The computer-implemented method for detecting illegal memory access of claim 8 wherein analyzing the shadow memory block to determine if the access is illegal comprises determining the length of the memory block and the offset of the address within the memory block.

10. The computer-implemented method for detecting illegal memory access of claim 9 wherein determining if the access is illegal comprises comparing the offset of the address within the memory block and the length of the memory block.

11. The computer-implemented method for detecting illegal memory access of claim 10 wherein the address is equal to a base address plus an offset value and determining if the access is illegal comprises comparing the length of the memory block with the offset of the base address within the memory block plus said offset value.

12. The computer-implemented method for detecting illegal memory access of claim 8 wherein determining if the access is illegal comprises reading a code value in a byte in the primary shadow memory block that maps the address.

13. The computer-implemented method for detecting illegal memory access of claim 12 comprises comparing the code value with a predetermined value encoding the information that the address refers to unallocated memory.

14. The computer-implemented method for detecting illegal memory access of claim 12 comprises comparing the code value with a predetermined value encoding the information that the length of the memory block is smaller or equal to a predetermined value.

15. The computer-implemented method for detecting illegal memory access of claim 14 wherein determining the length of the memory block comprises decoding the code value.

16. The computer-implemented method for detecting illegal memory access of claim 14 wherein determining the offset of the address within the memory block comprises decoding the code value.

17. The computer-implemented method for detecting illegal memory access of claim 14 comprises comparing the code value with a predetermined value encoding the information that the length of the memory block is greater than a predetermined value.

18. The computer-implemented method for detecting illegal memory access of claim 17 wherein determining the length of the memory block comprises:
  decoding the code value,
  determining, from the code value, the base address of a segment in a secondary shadow memory block,
  reading a first value in the segment to determine the length of the memory block.

19. The computer-implemented method for detecting illegal memory access of claim 18 wherein determining the offset of address within the memory block comprises:
  reading a second value in the segment to determine an offset from the base address of the segment to the base address of the secondary shadow memory block,
  determining the base address of the secondary shadow memory block,
  determining the offset of address within the memory block from the base address of the secondary shadow memory block.

20. The computer-implemented method for detecting illegal memory access of claim 12 comprising determining if the address is initialized by evaluating a bit of the byte in the primary shadow memory block that maps the address.

21. A system for detecting illegal memory access by a program executed by the system, the system comprising an application memory and a processor configured for encoding the application memory using a shadow memory corresponding to the application memory, by:
  creating and initializing a primary shadow memory, each byte in the application memory being mapped to a corresponding byte in the primary shadow memory,
  for each memory block in the application memory that the program allocates, encoding a corresponding primary shadow memory block, in the primary shadow memory, by:
    comparing the length L of the memory block with a predetermined value T and, if L is smaller or equal to T,
    for each byte p in the primary shadow memory block corresponding to a byte b in the application memory block, writing in Nb bits of the byte p, Nb being an integer, a first code value that encodes the length of the memory block and the offset of the byte b within the memory block,
  creating and initializing a secondary shadow memory, each byte in the application memory being mapped to a corresponding byte in the secondary shadow memory,
  for each memory block in the application memory that the program allocates, comparing the length L of the memory block with a predetermined value T and, if L is greater than T:
    defining a corresponding secondary shadow memory block, in the secondary shadow memory, being divided into segments having all equal sizes and trailing bytes,
    encoding a corresponding primary shadow memory block, in the primary shadow memory, by, for each byte of the primary shadow memory block, writing, in Nb bits of the byte, a second code value that encodes an offset between a corresponding byte in a secondary shadow memory block and a base address of a segment in the secondary shadow memory block,
  encoding the secondary shadow memory block, by:
    writing in a first part of each segment, a value indicative of the length of the memory block,
    writing in a second part of each segment, a value indicative of the offset from the base address of the segment to the base address of the secondary shadow memory block.

22. A system for detecting illegal memory access by a program executed by the system, the system comprising an application memory and a processor configured for executing the steps of:
  encoding the application memory using a shadow memory corresponding to the application memory, by:
    creating and initializing a primary shadow memory, each byte in the application memory being mapped to a corresponding byte in the primary shadow memory,
  for each memory block in the application memory that the program allocates, encoding a corresponding primary shadow memory block, in the primary shadow memory, by:
    comparing the length L of the memory block with a predetermined value T and, if L is smaller or equal to T,
  for each byte p in the primary shadow memory block corresponding to a byte b in the application memory block, writing in Nb bits of the byte p, Nb being an integer, a first code value that encodes the length of the memory block and the offset of the byte b within the memory block,
  creating and initializing a secondary shadow memory, each byte in the application memory being mapped to a corresponding byte in the secondary shadow memory,
  for each memory block in the application memory that the program allocates, comparing the length L of the memory block with a predetermined value T and, if L is greater than T:
    defining a corresponding secondary shadow memory block, in the secondary shadow memory, being divided into segments having all equal sizes and trailing bytes,
    encoding a corresponding primary shadow memory block, in the primary shadow memory, by, for each byte of the primary shadow memory block, writing, in Nb bits of the byte, a second code value that encodes an offset between a corresponding byte in a secondary shadow memory block and a base address of a segment in the secondary shadow memory block, encoding the secondary shadow memory block, by:

writing in a first part of each segment, a value indicative of the length of the memory block, writing in a second part of each segment, a value indicative of the offset from the base address of the segment to the base address of the secondary shadow memory block, and, when the program accesses to an address in an application memory block, analyzing the primary shadow memory block to determine if the access is illegal.

23. A computer program comprising instructions stored on a tangible non-transitory storage medium for executing on a processor a method for encoding an application memory that a program, executed on a computer, has access to, using a shadow memory corresponding to the application memory, the method comprising:

creating and initializing a primary shadow memory, each byte in the application memory being mapped to a corresponding byte in the primary shadow memory, for each memory block in the application memory that the program allocates, encoding a corresponding primary shadow memory block, in the primary shadow memory, by:

comparing the length L of the memory block with a predetermined value T and, if L is smaller or equal to T, for each byte p in the primary shadow memory block corresponding to a byte b in the application memory block, writing in Nb bits of the byte p, Nb being an integer, a first code value that encodes the length of the memory block and the offset of the byte b within the memory block, creating and initializing a secondary shadow memory, each byte in the application memory being mapped to a corresponding byte in the secondary shadow memory, for each memory block in the application memory that the program allocates, comparing the length L of the memory block with a predetermined value T and, if L is greater than T:

defining a corresponding secondary shadow memory block, in the secondary shadow memory, being divided into segments having all equal sizes and trailing bytes, encoding a corresponding primary shadow memory block, in the primary shadow memory, by, for each byte of the primary shadow memory block, writing, in Nb bits of the byte, a second code value that encodes an offset between a corresponding byte in a secondary shadow memory block and a base address of a segment in the secondary shadow memory block, encoding the secondary shadow memory block, by:

writing in a first part of each segment, a value indicative of the length of the memory block, writing in a second part of each segment, a value indicative of the offset from the base address of the segment to the base address of the secondary shadow memory block.

24. A computer program comprising instructions stored on a tangible non-transitory storage medium for executing on a processor a method for detecting illegal memory access by a program executed on a computer having a processor and an application memory, the method comprising:

encoding an application memory that the program has access to, using a shadow memory corresponding to the application memory, by:

creating and initializing a primary shadow memory, each byte in the application memory being mapped to a corresponding byte in the primary shadow memory, for each memory block in the application memory that the program allocates, encoding a corresponding primary shadow memory block, in the primary shadow memory, by:

comparing the length L of the memory block with a predetermined value T and, if L is smaller or equal to T, for each byte p in the primary shadow memory block corresponding to a byte b in the application memory block, writing in Nb bits of the byte p, Nb being an integer, a first code value that encodes the length of the memory block and the offset of the byte b within the memory block, creating and initializing a secondary shadow memory, each byte in the application memory being mapped to a corresponding byte in the secondary shadow memory, for each memory block in the application memory that the program allocates, comparing the length L of the memory block with a predetermined value T and, if L is greater than T:

defining a corresponding secondary shadow memory block, in the secondary shadow memory, being divided into segments having all equal sizes and trailing bytes, encoding a corresponding primary shadow memory block, in the primary shadow memory, by, for each byte of the primary shadow memory block, writing, in Nb bits of the byte, a second code value that encodes an offset between a corresponding byte in a secondary shadow memory block and a base address of a segment in the secondary shadow memory block, encoding the secondary shadow memory block, by:

writing in a first part of each segment, a value indicative of the length of the memory block, writing in a second part of each segment, a value indicative of the offset from the base address of the segment to the base address of the secondary shadow memory block, and, when the program accesses to an address in an application memory block, analyzing the primary shadow memory block to determine if the access is illegal.

* * * * *

UNITED STATES PATENT AND TRADEMARK OFFICE
CERTIFICATE OF CORRECTION

PATENT NO. : 10,445,020 B2  
APPLICATION NO. : 15/826571  
DATED : October 15, 2019  
INVENTOR(S) : Kostyantyn Vorobyov et al.

Page 1 of 1

It is certified that error appears in the above-identified patent and that said Letters Patent is hereby corrected as shown below:

In the Claims

In Claim 2, Column 21, Line 44, "predetermined value $n_z$" should be -- predetermined value $n_2$ --.

Signed and Sealed this  
Thirty-first Day of December, 2019

Andrei Iancu  
*Director of the United States Patent and Trademark Office*